United States Patent [19]

Ogata et al.

[11] Patent Number: 4,789,653

[45] Date of Patent: Dec. 6, 1988

[54] METHOD FOR PRODUCTION OF CERAMIC COMPOSITION

[75] Inventors: Yasuyuki Ogata; Hidetsugu Ono; Seiji Yamanaka, all of Saitama, Japan

[73] Assignee: Mitsubishi Mining and Cement Co., Ltd., Tokyo, Japan

[21] Appl. No.: 937,173

[22] Filed: Dec. 2, 1986

[30] Foreign Application Priority Data

Mar. 18, 1986 [JP] Japan .................................. 61-60332

[51] Int. Cl.$^4$ .............................................. C04B 35/46
[52] U.S. Cl. ..................................... 501/134; 501/102; 501/103; 501/126; 423/21.1; 423/71; 423/92; 423/593; 423/598; 423/608
[58] Field of Search ................ 423/21.1, 71, 593, 598, 423/608, 92; 501/134, 102, 103, 126

[56] References Cited

U.S. PATENT DOCUMENTS

| | | |
|---|---|---|
| 3,825,653 | 7/1974 | Duerksen et al. ................ 501/134 |
| 4,266,978 | 5/1981 | Prochazka ......................... 501/102 |
| 4,537,865 | 8/1985 | Okabe et al. ..................... 501/138 |
| 4,543,341 | 9/1985 | Barringer et al. ................ 501/134 |
| 4,595,580 | 6/1986 | Uedaira et al. .................. 423/593 |
| 4,606,906 | 8/1986 | Ritter et al. ..................... 501/136 |
| 4,636,248 | 1/1987 | Ogata et al. ..................... 423/593 |
| 4,636,908 | 1/1987 | Yoshihara et al. ............... 501/136 |
| 4,640,905 | 2/1987 | Burn .................................. 501/136 |
| 4,696,810 | 9/1987 | Shirasaka et al. ............... 423/593 |

FOREIGN PATENT DOCUMENTS 862345 4/1986 Int'l Pat. Institute ............. 423/598
59-27402 2/1984 Japan .................................. 501/102

OTHER PUBLICATIONS

*Dictionary of Ceramic Science and Engineering*, L. O'Bannon, Plenum Press, NY (1984) p. 54.
*Advanced Inorganic Chemistry*, F. Cotton, et al., Interscience Publishers, NY, 2nd ed. (1966), pp. 799–805.

*Primary Examiner*—William R. Dixon, Jr.
*Assistant Examiner*—Andrew Griffis
*Attorney, Agent, or Firm*—Frank J. Jordan; C. Bruce Hamburg; Manabu Kanesaka

[57] ABSTRACT

A ceramic composition represented by the following general formula:

$$Pb_{1-x}La_x(Zr_yTi_{1-y})_{1-x/4}O_3$$

wherein $0<x<1$, $0<y<1$) is produced by a method which comprises adding a mixed solution of a titanium alkoxide and a zirconium alkoxide to an aqueous solution containing lead nitrate and/or lead acetate and lanthanum nitrate and/or lanthanum acetate thereby simultaneously effecting hydrolysis of said alkoxides and coprecipitation of lanthanum components, further adding an alkaline substance to the resultant system thereby effecting substantially thorough precipitation of lead and lanthanum components, and heating the produced precipitate.

8 Claims, No Drawings

METHOD FOR PRODUCTION OF CERAMIC COMPOSITION

BACKGROUND OF THE INVENTION AND RELATED ART STATEMENT

This invention relates to a method for the production of a ceramic composition and more particularly relates to a method for the production of a ceramic powder represented by the following general formula (I):

$$Pb_{1-x}La_x(Zr_yTi_{1-y})_{1-x/4}O_3 \quad (I)$$

(wherein $0<x<1$, $0<y<1$) which is useful as a dielectric material, a transparent ceramic material, and an electrooptically functioning material.

In recent years, functional ceramics such as ceramic condensers and ceramic optical materials have been required to be manufactured as small and accurately as possible with reliability.

In practically utilizing such ceramics the cost of their firing increases in proportion as the sintering temperature raises. Particularly, when the ceramics are utilized in multilayer condensers, they require such expensive high-melting noble metals as Pd and Pt as inner electrodes. This fact creates a serious hindrance to reducing the cost of condensers. For reducing production costs of multilayer condensers, therefore, an idea of using electrodes made mainly of less expensive silver as inner electrodes for multilayer condensers is conceivable. In order to use silver inner electrodes, it is highly desirable that the functional ceramics should be capable of being effectively sintered at low temperatures.

In connection with such functional ceramics, the compound represented by the aforementioned general formula (I) (hereinafter referred to at times as "PLZT" for short) have long been given attention as polyfunctional materials which posses of dielectric characteristics, transparency, electrooptic characteristics, etc.

Heretofore, PLZT's have been generally produced by using oxides and carbonates of various metallic components as starting materials, mixing and pulverizing these materials in a mortar or a ball mill, and firing the resulting mixtures.

This conventional method for the production of the PLZT's, however, provides insufficient mixing of materials, readily results in impurities while mixing, and performs pulverization only to a limited extent. The conventional method cannot attain homogenization and high purification of the composition of the produced mixture and sufficient micronization of powdered raw materials.

The PLZT's obtained by this method, therefore, are hardly satisfactory in their characteristics, including the low-temperature sintering property. None of the conventional methods, therefore, has realized commercial production of functional ceramics enjoying enhanced accuracy and improved reliability at lowered prices.

SUMMARY OF THE INVENTION

An object of this invention is to provide a method capable of producing a PLZT ceramic powder of the aforementioned general formula (I), (1) in high purity, (2) with an amply homogeneous composition, and (3) in a highly pulverized form without entailing the aforementioned drawbacks of the conventional method.

Another object of this invention is to enhance the function and characteristics of ceramics produced from the powder of the aforementioned general formula (I) and, at the same time, ensure the improvement of the low-temperature sintering property of the powder.

The objects described above are accomplished by a method for the production of a ceramic composition represented by the following general formula (I):

$$Pb_{1-x}La_x(Zr_yTi_{1-y})_{1-x/4}O_3$$

(wherein $0<x<1$, $0<y<1$), which method is characterized by obtaining a ceramic composition of the aforementioned general formula (I) by adding a mixed solution of a titanium alkoxide and a zirconium alkoxide to an aqueous solution containing lead nitrate and/or lead acetate and lanthanum nitrate and/or lanthanum acetate thereby effecting hydrolysis of the alkoxides and coprecipitation of lead and lanthanum, further adding to the resulting mixed system an alkaline substance thereby effecting precipitation of lead and lanthanum substantially wholly, and heating the precipitate consequently formed.

DETAILED DESCRIPTION OF THE PREFERRED EMBODIMENTS

In this invention, a mixed solution of titanium alkoxide and zirconium alkoxide is added dropwise to an aqueous solution containing lead nitrate and/or lead acetate and lanthanum nitrate and/or lanthanum acetate to induce hydrolysis of titanium alkoxide and zirconium alkoxide and, at the same time, effect coprecipitation of lead and lanthanum components.

This invention uses lead nitrate and/or lead acetate as raw material(s) for the lead component of PLZT and lanthanum nitrate and/or lanthanum acetate as raw material(s) for the lanthanum component of PLZT. These raw materials can be easily refined to high purity by recrystallizing commercial grade products.

As raw materials for the titanium and zirconium components, a titanium alkoxide and a zirconium alkoxide represented, respectively, by the following chemical formulas (a), (b) are used.

$$Ti(OR)_4 \ldots \quad (a)$$

$$Zr(OR)_4 \ldots \quad (b)$$

(wherein R stands for an alkyl group).

The specific kind of the alkyl group R in these alkoxides is not critical. For the convenience of handling, for example, it is generally desirable to use alkoxides of such a lower alkyl group as a methyl group, ethyl group, isopropyl group, or butyl group. The titanium alkoxide and zirconium alkoxide can be obtained by conventional methods, e.g., by the introduction of ammonia gas into an alcohol solution of titanium (or zirconium) chloride which results in a reaction of the following chemical formula (c):

$$TiCl_4 + 4ROH + 4NH_3 \rightarrow Ti(OR)_4 + 4NH_4Cl \ldots \quad (c)$$

These alkoxides are commercially available in sufficiently high purity for use in the present invention. Examples of the commercially available alkoxide include titanium propoxide ($Ti(OC_3H_7)_4$), titanium butoxide ($Ti(OC_4H_9)_4$), zirconium propoxide ($Zr(OC_3H_7)_4$), and zirconium butoxide ($Zr(OC_4H_9)_4$).

For the preparation of the aqueous solution containing lead nitrate and/or lead acetate and lanthanum nitrate and/or lanthanum acetate, it suffices to have the indicated raw materials dissolved in water in predetermined amounts to obtain the PLZT in a desired percentage composition. In this case, the amount of water is desired to be as small as permissible for the convenience of handling. Generally, it is desirable to use the raw materials in such amounts as to be contained in concentration in the range of 5 to 40% by weight in the prepared aqueous solution.

The solution of these raw materials in water is desired to be carried out at a temperature approximately in the range of 10° to 80° C.

The mixed solution of alkoxides to be added to the aqueous solution containing lead ion and lanthanum ion and obtained as described above is prepared by mixing the titanium alkoxide and the zirconium alkoxide in amounts calculated to produce the PLZT in a desired percentage composition. Desirably, this mixed solution of alkoxides is added dropwise with agitation to the aqueous solution containing lead ion and lanthanum ion at a rate falling approximately in the range of 1 to 40 ml/min. By this addition, hydrolysis of the alkoxides and coprecipitation of the lead and lanthanum components are simultaneously effected. For the convenience of handling, the reaction temperature is desirably in the range of 0° to 100° C., and particularly in the range of 10° to 70° C. Though the reaction is generally carried out under atmospheric pressure, it may be carried out under an increased pressure of not higher than 250 atmospheres or under a vacuum of not lower than 0.1 atmosphere as occasion demands.

Then in the method of this invention, to the system in which the aforementioned simultaneous hydrolysis and coprecipitation have been completed, an alkaline substance is added to adjust the pH of the liquid phase of the system so as to effect substantially thorough precipitation of the lead and lanthanum components dissolved in small amounts in the liquid phase.

To be specific, lead ion and lanthanum ion are generally dissolved, though slightly, in the liquid phase of the suspension resulting from the simultaneous hydrolysis and coprecipitation of the supernatant of the suspension. By the addition of the alkaline substance to the system mentioned above, therefore, the pH of the liquid is increased to a point where the lead and lanthanum components are substantially thoroughly precipitated.

An alkali metal hydroxide such as sodium hydroxide or an alkaline earth metal hydroxide such as barium hydroxide is usable as the alkali for this addition. These hydroxides, however, can cause contamination of the produced PLZT powder. It is, therefore, desirable to use ammonia or an amine type alkaline compound for the pH adjustment. Concrete examples of the alkaline substance usable desirably for the pH adjustment include methyl amine, dimethyl amine, trimethyl amine, ethyl amine, diethyl amine, and triethyl amine besides aqua ammonia.

The amount of the alkaline substance thus added for the purpose mentioned is suitably fixed at a sufficient level for substantially thorough precipitation of the lead component and the lanthanum component, depending on the composition of the PLZT desired to be produced, the particular kinds of raw materials to be used, and the reaction conditions to be involved. Generally, the alkaline substance is desired to be added in an amount such as to adjust the pH of the reaction system approximately in the range of 7 to 11.

The PLZT crystals are obtained by separating the precipitate consequently formed in the reaction system, as by filtration, drying the separated precipitate, and heating the dried solid mass. In this case, the heating is desired to be carried out at a temperature of not lower than 500° C. and not higher than the decomposition point of the PLZT.

The PLZT powder obtained by the method of this invention described above, on observation under an electron microscope, is found to have an extremely small and uniform diameter of 0.06 to 0.09 $\mu$m, in a case where the dried precipitate is fired at 500° C. for 2 hours.

Since the method of the present invention basically resorts to a liquid-phase reaction, it can produce the PLZT in a high purity with a homogeneous composition as compared with the conventional method. Further, since the precipitation of the individual components is effected substantially thoroughly by the addition of the alkaline substance, the PLZT can be safely and easily produced in a desired percentage composition from raw materials used in predetermined amounts. Owing to the heating, the produced PLZT is finally obtained in the form of a fine powder consisting of particles of a highly uniform diameter.

The ceramic composition to be consequently obtained, therefore, excels in characteristics, such as dielectric constant, insulation resistance, and volume resistance invariably at high levels and involving only a small dielectric loss. By the use of the ceramic composition obtained by the present invention, therefore, compact large-capacity condensers of high reliability can be produced.

Moreover, since the ceramic composition obtained by this invention possesses a highly satisfactory low-termperature sintering property and is effectively fired at a low-temperature, the cost of burning is low. When this ceramic composition is used in a layer condenser, therefore, the layer condenser can be produced using inner electrodes made of a less expensive silver type substance. Thus, the layer condenser can be obtained that a low production cost and supplied at a generously lowered price.

For the purpose of this invention, the variables x and y in the aforementioned general formula (I) desirably have values such as to fall in the respective ranges of $0<x<1$ and $0<y<1$, preferably $0.02 \leq x \leq 0.25$ and $0.10 \leq y \leq 0.90$. The reason for these ranges is that the PLZT is obtained with the most desirable characteristics when the composition satisfies these ranges.

Working examples and comparative experiments will now be set forth for illustration of the characteristics of the PLZT powder produced by the present invention, specifically with respect to the low-temperature sintering property and the dielectric characteristics among other functions of the PLZT. It should be noted, however, that this invention is not limited to the following working examples but may be practiced otherwise without departing from the spirit of the invention.

The dielectric characteristics of the PLZT powders obtained in the working examples and comparative experiments cited below were obtained by a procedure comprising the steps of firing a given powder at 700° C. for 5 hours, compression molding the fired powder under a pressure of 3,000 kgf/cm$^2$ to produce discs 16 mm in diameter and 1 mm in thickness, depositing silver electrodes by baking on both sides of the sintered discs, and determining their dielectric constant, dielectric loss, and electric resistance at 25°. Additionally, the discs fitted with the silver electrodes were tested for the ratio of change of static capacity (TC) at −55° C. and 125° C., based on the static capacity at 25° C. The dielectric constant and the dielectric loss were determined by the use of a digital LCR meter at 1 kHz. The electric resistance was determined with an insulation resistance meter after 5 seconds' application of a voltage of 100 V.

Synthesis of $Pb_{0.88}La_{0.12}(Zr_{0.70}Ti_{0.30})_{0.97}O_3$

Example 1

To an aqueous solution obtained by dissolving 291 g of lead nitrate 99.9% in purity and 52.0 g of lanthanum nitrate hexahydrate 99.99% in purity in 800 ml of water at 40° C., a solution obtained by mixing 82.7 g of titanium iso-propoxide (commercial product 99.99% in purity) with 261 g of zirconium butoxide (commercial product 99.99% in purity) was gradually added dropwise with agitation at 40° C. over a period of 2 hours. After completion of the dropwise addition, 150 g of aqua ammonia (28%) was added dropwise to the resulting mixture at a rate of 30 ml/min.

The precipitate consequently formed in the reaction system was separated by filtration using a filter paper. The separated precipitate was dried at 80° C. for 10 hours and then heated at 700° C. for 5 hours, to obtain a PLZT powder of the desired composition.

The dielectric characteristics of the produced powder were as shown in Table 1.

Comparative Experiment 1

The metal oxides, PbO, $TiO_2$, $La_2O_3$, and $ZrO_2$ in amounts calculated to give the same percentage composition as in Example 1 were mixed and pulverized in a ball mill. The resulting mixture was calcined at 700° C. for 5 hours and then pulverized again in the ball mill to prepare a PLZT powder having the same composition as in Example 1.

The dielectric characteristics of the produced powder were as shown in Table 1.

Synthesis of $Pb_{0.88}La_{0.12}(Zr_{0.65}Ti_{0.35})_{0.97}O_3$

Example 2

A PLZT powder of the desired composition was obtained by following the procedure of Example 1, expecting lead acetate was used in place of lead nitrate and lanthanum acetate was used in place of lanthanum nitrate and the mixing ratio of the raw materials was varied to suit the composition.

The dielectric characteristics of the produced powder were as shown in Table 2.

Comparative Experiment 2

A PLZT powder of the same composition as in Example 2 was prepared by following the procedure of Comparative Experiment 1, excepting the mixing ratio of the raw materials was varied to suit the composition.

The dielectric characteristics of the produced powder were as shown in Table B 2.

Examples 3–10

Powdered compositions having the variables, x and y, in the aforementioned general formula (I) varied as indicated in Table 3 were obtained by following the procedure of Example 1, excepting the mixing ratios of the raw materials were accordingly varied.

The dielectric characteristics of the produced powders were as shown in Table 3.

It is plain from Tables 1 through 3 that, in accordance with the present invention, there were obtained PLZT powders having extremely low sintering temperatures and exhibiting excellent electrical properties.

TABLE 1

Dielectric characteristics of $Pb_{0.88}La_{0.12}(Zr_{0.70}Ti_{0.30})_{0.97}O_3$

| Firing temperature (°C.) | Sintering density (g/cm³) | | Dielectric constant ($\epsilon$) | | Dielectric loss (%) | | Resistivity ($\times 10^{13}$ Ω·cm) | | TC (%) (−55° C., 125° C.) | |
|---|---|---|---|---|---|---|---|---|---|---|
| | Ex* 1 | CE** 1 | Ex 1 | CE 1 | Ex 1 | CE 1 | Ex 1 | CE 1 | Ex 1 | CE 1 |
| 1050 | 7.51 | 6.77 | 2510 | 1750 | 1.1 | 5.9 | 1.2 | 0.2 | −36, −15 | −39, −18 |
| 1100 | 7.48 | 7.10 | 2380 | 2110 | 1.1 | 2.4 | 1.3 | 0.8 | −32, −12 | −35, −14 |
| 1150 | 7.47 | 7.21 | 2300 | 2180 | 0.9 | 1.7 | 1.5 | 0.8 | −24, −10 | −29, −12 |
| 1200 | 7.45 | 7.29 | 2300 | 2220 | 1.0 | 1.5 | 1.5 | 0.7 | −20, −8 | −24, −12 |

Ex* = Example
CE** = Comparative Experiment

TABLE 2

Dielectric characteristics of $Pb_{0.88}La_{0.12}(Zr_{0.65}Ti_{0.35})_{0.97}O_3$

| Firing temperature (°C.) | Sintering density (g/cm³) | | Dielectric constant ($\epsilon$) | | Dielectric loss (%) | | Resistivity ($\times 10^{13}$ Ω·cm) | | TC (%) (−55° C. 125° C.) | |
|---|---|---|---|---|---|---|---|---|---|---|
| | Ex 2 | CE** 2 | Ex 2 | CE 2 | Ex 2 | CE 2 | Ex 2 | CE 2 | Ex 2 | CE 2 |
| 1050 | 7.50 | 6.78 | 2490 | 1700 | 0.5 | 8.0 | 1.3 | 0.5 | −38, −17 | −40, −20 |
| 1100 | 7.50 | 7.05 | 2330 | 2060 | 1.0 | 2.4 | 1.4 | 0.7 | −33, −15 | −37, −17 |
| 1150 | 7.47 | 7.19 | 2330 | 2130 | 1.0 | 1.9 | 1.0 | 0.8 | −30, −12 | −35, −13 |
| 1200 | 7.44 | 7.25 | 2320 | 2170 | 1.0 | 1.9 | 1.0 | 0.8 | −35, −15 | −37, −15 |

TABLE 3

| Ex No. | Composition x | Composition y | Firing temperature (°C.) | Sintering density (g/cm³) | Dielectric constant ($\epsilon$) | Dielectric loss (%) | Resistivity ($\times 10^{13}$ Ω·cm) | TC (%) (−55° C., 125° C.) | |
|---|---|---|---|---|---|---|---|---|---|
| 3 | 0.10 | 0.7 | 1050 | 7.62 | 2320 | 1.0 | 1.5 | −45 | −5 |
| | | | 1100 | 7.60 | 2300 | 1.0 | 1.4 | −40 | −4 |
| | | | 1150 | 7.58 | 2290 | 1.0 | 1.2 | −33 | −4 |
| | | | 1200 | 7.50 | 2280 | 1.0 | 1.2 | −30 | −4 |
| 4 | 0.11 | 0.7 | 1050 | 7.62 | 2490 | 1.0 | 1.6 | −41 | −11 |

TABLE 3-continued

| Ex No. | Composition x | y | Firing temperature (°C.) | Sintering density (g/cm³) | Dielectric constant (ε) | Dielectric loss (%) | Resistivity (× 10¹³ Ω · cm) | TC (%) (−55° C., | 125° C.) |
|---|---|---|---|---|---|---|---|---|---|
|  |  |  | 1100 | 7.60 | 2450 | 1.0 | 1.4 | −36 | −9 |
|  |  |  | 1150 | 7.58 | 2420 | 0.9 | 1.3 | −29 | −8 |
|  |  |  | 1200 | 7.51 | 2400 | 0.9 | 1.3 | −23 | −6 |
| 5 | 0.13 | 0.7 | 1050 | 7.59 | 1610 | 1.1 | 1.7 | −31 | −19 |
|  |  |  | 1100 | 7.58 | 2160 | 1.2 | 1.8 | −26 | −18 |
|  |  |  | 1150 | 7.57 | 2580 | 1.1 | 1.5 | −21 | −14 |
|  |  |  | 1200 | 7.54 | 2550 | 1.0 | 1.4 | −17 | −12 |
| 6 | 0.14 | 0.7 | 1050 | 7.60 | 2730 | 1.1 | 1.6 | −27 | −21 |
|  |  |  | 1100 | 7.60 | 2700 | 0.9 | 1.7 | −21 | −19 |
|  |  |  | 1150 | 7.54 | 2680 | 0.9 | 1.4 | −18 | −18 |
|  |  |  | 1200 | 7.53 | 2600 | 0.9 | 1.3 | −15 | −18 |
| 7 | 0.12 | 0.6 | 1050 | 7.58 | 2430 | 1.2 | 1.8 | −37 | −19 |
|  |  |  | 1100 | 7.58 | 2400 | 0.9 | 1.8 | −33 | −18 |
|  |  |  | 1150 | 7.57 | 2380 | 0.9 | 1.3 | −30 | −17 |
|  |  |  | 1200 | 7.52 | 2360 | 0.9 | 1.4 | −30 | −15 |
| 8 | 0.12 | 0.58 | 1050 | 7.57 | 2290 | 1.1 | 1.7 | −36 | −19 |
|  |  |  | 1100 | 7.57 | 2280 | 1.0 | 1.6 | −35 | −20 |
|  |  |  | 1150 | 7.57 | 2250 | 1.0 | 1.7 | −31 | −20 |
|  |  |  | 1200 | 7.51 | 2200 | 1.0 | 1.6 | −29 | −20 |
| 9 | 0.12 | 0.75 | 1050 | 7.63 | 2590 | 1.6 | 1.7 | −38 | −17 |
|  |  |  | 1100 | 7.62 | 2570 | 1.0 | 1.7 | −34 | −15 |
|  |  |  | 1150 | 7.61 | 2530 | 1.0 | 1.7 | −34 | −15 |
|  |  |  | 1200 | 7.54 | 2510 | 1.0 | 1.5 | −33 | −14 |
| 10 | 0.11 | 0.75 | 1050 | 7.70 | 2680 | 1.0 | 1.8 | −38 | −19 |
|  |  |  | 1100 | 7.69 | 2670 | 1.0 | 1.6 | −34 | −20 |
|  |  |  | 1150 | 7.62 | 2650 | 0.9 | 1.7 | −30 | −20 |
|  |  |  | 1200 | 7.58 | 2610 | 0.9 | 1.6 | −30 | −20 |

We claim:

1. A method for the production of a ceramic composition represented by the following general formula:

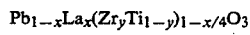

$$Pb_{1-x}La_x(Zr_yTi_{1-y})_{1-x/4}O_3$$

(wherein $0<x<1$, $0<y<1$), comprising the steps of adding a mixed solution of a titanium alkoxide and a zirconium alkoxide in amounts to satisfy the ratio of the general formula to an aqueous solution containing at least one of lead nitrate and lead acetate and at least one of lanthanum nitrate and lanthanum acetate in amounts to satisfy the ratio of the general formula thereby simultaneously effecting hydrolysis of said alkoxides and coprecipitation of lead and lanthanum components, further adding an alkaline substance to the resultant system to adjust pH thereby effecting substantially thorough precipitation of lead and lanthanum components, and heating the produced precipitate at a temperature of not lower than 500 degrees centigrade and not higher than the decomposition temperature of said ceramic composition.

2. A method according to claim 1, wherein aqua ammonia is used as said alkaline substance.

3. A method according to claim 1, wherein the variables x and y in said general formula have values falling in the respective ranges, $0.02 \leq x \leq 0.25$ and $0.10 \leq y \leq 0.90$.

4. A method according to claim 1, wherein said titanium alkoxide is selected from the group consisting of titanium methoxide, titanium ethoxide, titanium iso-propoxide and titanium butoxide.

5. A method according to claim 1, wherein said zirconium alkoxide is selected from the group consisting of zirconium methoxide, zirconium ethoxide, zirconium iso-propoxide and zirconium butoxide.

6. A method according to claim 1, wherein said aqueous solution containing at least one of lead nitrate and lead acetate and at least one of lanthanum nitrate and lanthanum acetate is an aqueous solution containing at least one of lead nitrate and lead acetate and at least one of lanthanum nitrate and lanthanum acetate in an amount of 5 to 40% by weight relative to a total amount of the components.

7. A method according to claim 1, wherein said simultaneous hydrolysis of alkoxides and coprecipitation of lead and lanthanum components is carried out at a temperature in the range of 0° to 100° C.

8. A method according to claim 1, wherein said alkaline substance is added in an amount to adjust the pH of the reaction system in the range of 7 to 11.

* * * * *